(12) United States Patent
Lynch

(10) Patent No.: US 8,434,124 B2
(45) Date of Patent: Apr. 30, 2013

(54) APPARATUS AND METHOD FOR SWITCHING BETWEEN AN INTERACTIVE MODE AND A TELEVISION PROGRAM MODE

(75) Inventor: David Johnston Lynch, Carmel, IN (US)

(73) Assignee: Thomson Licensing LLC, Boulogne Billancourt (FR)

( * ) Notice: Subject to any disclaimer, the term of this patent is extended or adjusted under 35 U.S.C. 154(b) by 1937 days.

(21) Appl. No.: 10/510,605

(22) PCT Filed: Apr. 2, 2003

(86) PCT No.: PCT/US03/10050
§ 371 (c)(1),
(2), (4) Date: Oct. 8, 2004

(87) PCT Pub. No.: WO03/088654
PCT Pub. Date: Oct. 23, 2003

(65) Prior Publication Data
US 2005/0235331 A1    Oct. 20, 2005

Related U.S. Application Data

(60) Provisional application No. 60/371,949, filed on Apr. 11, 2002.

(51) Int. Cl.
*G06F 3/00* (2006.01)
*G06F 13/00* (2006.01)
*H04N 5/445* (2006.01)
*H04N 7/173* (2006.01)
*H04N 7/16* (2006.01)

(52) U.S. Cl.
USPC ............ 725/140; 38/51; 38/132; 38/135; 38/141

(58) Field of Classification Search .................. None
See application file for complete search history.

(56) References Cited

U.S. PATENT DOCUMENTS 6,002,443 A * 12/1999 Iggulden .................. 348/553
6,029,045 A *  2/2000 Picco et al. ................ 725/34
(Continued)

FOREIGN PATENT DOCUMENTS

CN    1333489 A       1/2002
EP    0 111 265 A1    1/1983
(Continued)

OTHER PUBLICATIONS

Search Report Dated Jun. 23, 2003.

*Primary Examiner* — Jun Fei Zhong
*Assistant Examiner* — Mushfikh Alam
(74) *Attorney, Agent, or Firm* — Robert D. Shedd; Reitseng Lin

(57) ABSTRACT

An apparatus and method for displaying at least two modes comprising an interactive application mode and a television program mode on a display device. In one aspect the apparatus comprises: a television program signal receiver; an interactive application signal receiver; means for switching between said television program mode and said interactive application mode being active in said display device; means to receive remote control signals from a remote control device having a mute key for generating a mute signal; means to enable a mute-to-interactive application feature; and wherein when said mute-to-interactive application feature is enabled and said television program mode is active in said display device, upon receipt of said mute signal, said mode switching means is activated causing said interactive application mode to be active in said display device.

3 Claims, 6 Drawing Sheets

U.S. PATENT DOCUMENTS

| | | | |
|---|---|---|---|
| 6,510,553 B1* | 1/2003 | Hazra | 725/87 |
| 6,698,020 B1* | 2/2004 | Zigmond et al. | 725/34 |
| 6,907,137 B2* | 6/2005 | Ruehl | 382/128 |
| 7,174,512 B2* | 2/2007 | Martin et al. | 715/719 |
| 7,177,881 B2* | 2/2007 | Schwesig et al. | 1/1 |
| 7,194,754 B2* | 3/2007 | Tomsen et al. | 725/60 |
| 2002/0049852 A1* | 4/2002 | Lee et al. | 709/231 |
| 2002/0056107 A1* | 5/2002 | Schlack | 725/46 |
| 2002/0059585 A1 | 5/2002 | Maeda et al. | |
| 2002/0100041 A1* | 7/2002 | Rosenberg et al. | 725/32 |
| 2002/0144262 A1* | 10/2002 | Plotnick et al. | 725/32 |
| 2002/0194595 A1* | 12/2002 | Miller et al. | 725/36 |
| 2003/0005463 A1* | 1/2003 | Macrae et al. | 725/112 |
| 2003/0163542 A1* | 8/2003 | Bulthuis et al. | 709/208 |
| 2003/0227567 A1* | 12/2003 | Plotnick et al. | 348/552 |
| 2004/0093619 A1* | 5/2004 | Cox | 725/110 |
| 2005/0149981 A1* | 7/2005 | Augenbraun et al. | 725/112 |
| 2009/0060450 A1* | 3/2009 | Daniels | 386/68 |

FOREIGN PATENT DOCUMENTS

| | | |
|---|---|---|
| JP | 2001-358966 A | 12/2001 |
| WO | 01/43424 A1 | 6/2001 |
| WO | WO01/56269 | 8/2001 |
| WO | 01/84824 A2 | 11/2001 |
| WO | WO 02/03683 | 1/2002 |

* cited by examiner

APPARATUS AND METHOD FOR SWITCHING BETWEEN AN INTERACTIVE MODE AND A TELEVISION PROGRAM MODE

CROSS-REFERENCE TO RELATED APPLICATION

This application claims the benefit, under 35 U.S.C. §365 of International Application PCT/US03/10050, filed Apr. 2, 2003, which was published in accordance with PCT Article 21(2) on Oct. 23, 2003 in English and which claims the benefit of U.S. Provisional Patent Application No. 60/371, 949, filed Apr. 11, 2002.

TECHNICAL FIELD OF THE INVENTION

This invention relates generally to the field of television receivers capable of receiving and displaying television program signals and interactive application signals, such as the Internet, and specifically to apparatus and methods for switching between television program mode and interactive application mode for display on television screens or other display devices.

BACKGROUND ART

The television industry has seen rapid development in the number of ways in which television programming can be delivered to and received by individual television sets in homes. While at one time, the only means for providing television programming signal to a television set was through the use of broadcasting signals and antenna reception, recent years have seen the development of cable and satellite transmission. These improved transmission methods have not only increased the quality of television viewing but have the ability to provide increased amounts and different kinds of data to the individual television for viewing and/or interacting. For example, it is now common for Internet access to be supplied through the same cable and/or transmission methods used to provide television program signals.

In order to display the various kinds of incoming signals/data on a television screen for a user in tangible form, various kinds of hardware and software, commonly referred to as receivers, are needed to decipher and/or decode the incoming signals. Receivers can be manufactured to be separate from television and set atop the television or can be built directly into the television itself. Many receivers have multiple ports for simultaneously receiving various kinds of incoming signals to be displayed on the television screen, such as television program signals, Internet data signals, or a signal from any type of local device, such as a VCR, a DVD player, or a popular video game console. However, because of the limited display area available on a television screen, it is common that only one type of signal be displayed on the television screen at any one time. While television sets do exist that have picture-in-picture capabilities that allow more than one signal to be displayed at once, only one signal is displayed in the primary display area of the television screen at any one time. Television viewers rarely view a program or any other application in the secondary display area for any extended amount of time.

Receivers are designed so that a user can easily change the signal that is being displayed on a television screen by entering the appropriate command into the receiver. Such user commands are inputted by a remote control device such as an infrared remote control. For example, suppose a particular receiver is designed to receive both an incoming television program signal and an interactive application signal, such as a browser signal that provides data from the World Wide Web. When the receiver is in television program mode, the incoming television signal is decoded (if necessary) and displayed on the television screen so the user can view a channel of the television program signal that is tuned in. Similarly, if the receiver is switched to the browser mode, the incoming browser signal will be decoded (if necessary) and displayed on the television screen so the user can interact with and navigate the World Wide Web.

In existing receivers, when a user wishes to switch from one mode to another, the user will press a "Change Mode" or similar key on a remote control device. In existing receivers that provide Internet access via a television, the remote control device will have "Web" key that when pressed will switch the receiver to browser mode if currently in television program mode and vice versa.

As the popularity of accessing and using the Internet (and other interactive applications) in a television setting increases, the profitability of advertising in these browser screens will also increase. Thus, a need exists for methods and apparatus that will increase the number of times in which a user accesses browser mode. However, increasing the number of occurrences of browser access should be done in such a way so as to minimize interference with a user's television program viewing.

Another common feature of existing receivers is the ability to automatically tune in a previously viewed channel upon receipt of a go-back command from a user when the receiver is in television program mode. For example, assume a user has the receiver in television program mode and has channel 4 tuned in for viewing on the television screen. Thereafter, the user changes the channel via the appropriate change channel command, tuning in channel 8. The user can automatically tune in and view the previously tuned channel, channel 4, by simply sending a go-back command to the receiver by pressing a go-back key on a remote control device. As such, a user can tune into a previously viewed channel without the need to remember the channel number.

In existing receivers, the go-back feature is limited to functioning within a single receiver mode and cannot be used to return to the most previously viewed content if that content was in a different mode. For example, if a user was browsing the Internet and then switched to television program mode by entering the appropriate command, the go-back command, when entered, would not return the user to the browser mode. The same is true if the user was watching a specific channel on television program mode and switched the receiver to browser mode. Thus, a need exists for apparatus and methods that will return a user to the most previously viewed item regardless of the mode in which the content exists.

Moreover, it is common that many television viewers do not like to watch and/or hear commercials that frequently interrupt the television programs that they are watching. Often, a viewer will mute the audio component of the tuned channel during a commercial break and wait for the desired program to return before un-muting the audio component of the tuned channel. This time is wasted both from the perspective of the viewer and from the perspective of potential browser mode advertisers. Thus, a need exists to be able to automatically switch a receiver to browser mode upon receiving an input signal from a user to mute the audio component of a tuned channel.

However, not all viewers wish to mute a tuned channel or change modes because they may miss a portion of the program that they were watching. A need exists to provide viewers who wish to avoid watching commercial breaks with a satisfactory way of automatically switching to browser mode when a commercial break starts and automatically returns back to television program mode without resulting in the viewer missing a substantial amount of the desired television program.

It is typical for receivers having browser mode and Internet capabilities to have the ability to download and store large amounts of data. One problem with downloading is that some downloads can take long periods of time to complete. During this time, the user must wait patiently. However, the user often becomes bored and wishes to undertake other tasks or be amused in some way, such as watching a television program. Thus, a need exists for an apparatus and method that automatically switches the receiver to television program mode during the downloading of large amounts of data and returns to browser mode upon completion of the download.

DISCLOSURE OF THE INVENTION

These needs, and others that will become apparent from the following disclosure and drawings, are met by the present invention which in one aspect is an apparatus for displaying at least two modes comprising an interactive application mode and a television program mode on a display device, the apparatus comprising: a television program signal receiver; an interactive application signal receiver; means for switching between said television program mode and said interactive application mode being active in said display device; means to receive remote control signals from a remote control device having a mute key for generating a mute signal; means to enable a mute-to-interactive application feature; and wherein when aid mute-to-interactive application feature is enabled and said television program mode is active in said display device, upon receipt of said mute signal, said mode switching means is activated causing said interactive application mode to be active in said display device.

It is preferred that when said mute-to-interactive application feature is enabled and said interactive application mode is active in said display device, upon receipt of said mute signal, said mode switching means is activated causing said television program mode to be active in said display device.

In one embodiment, it is preferred that the inventive apparatus further comprise: means to switch channels when said television program mode is active in said display device; means to store a last viewed item as a go-back channel; said remote control device having a go-back channel key for generating a go-back channel signal; means to return to said go-back channel for display in said display device upon receipt of said go-back channel signal; wherein when said television program mode is active and said last viewed item is said interactive application mode, upon receipt of said go-back channel signal, said mode switching means is activated causing said interactive application mode to be active in said display device.

In this embodiment, it is preferred that when said interactive application mode is active and said last viewed item is a first channel of said television program mode, upon receipt of said go-back channel signal, said mode switching means is activated causing said television program mode to be active and said first channel to be displayed in said display device. It is further preferable that when in television program mode and said last viewed item is a first channel, upon receipt of said go-back channel signal, said channel switching means is activated causing said first channel to be displayed in said display device.

In yet another embodiment, the apparatus further comprises: means to enable a commercial skip feature in response to a commercial skip signal; said remote control device having a commercial skip key for generating a commercial skip signal; wherein when said commercial skip feature is activated and said television program mode is active, upon detecting a beginning of a commercial break, said mode switching means is activated causing said interactive application mode to be active until either detection of an end of a commercial break or upon elapse of a selected period of time. The commercial skip feature can be adapted to detect said beginning and said end of said commercial break.

In still another embodiment, the apparatus application mode will be a browser mode and the apparatus will further comprise: means to enable a television during download function; wherein when said browser mode is active and said television during download function is enabled, upon a download above a threshold time being detected, said mode witching means is activated causing said television program mode to be active until detection of completion of said download.

In another aspect, the invention is a method of switching between at least two modes comprising an interactive application mode and a television program mode, the method comprising: receiving a television program signal; receiving an interactive application signal; displaying one of said television program signal or said interactive application signal in a display device; upon receipt of a mute-to-interactive application enabling command, enabling a mute-to-interactive application feature; wherein when said mute-to-interactive application feature is enabled and said television program signal is being displayed in said display device, upon receipt of a mute signal from a remote control device, activating a mode switching mean causing said interactive application signal to be displayed in said display device.

In this embodiment of the inventive method, when said mute-to-interactive application feature is enabled and said interactive application signal is being displayed in said display device, upon receipt of said mute signal, it is preferable that the method comprise activating said mode switching means causing said television program signal to be displayed in said display device.

In another embodiment, the method further comprises: tuning a channel of said television program signal for display in said display device; storing a last viewed item as a go-back channel in a memory source in response to a channel change or a mode switch; and wherein when said television program signal is being displayed and said last viewed item is said interactive application signal, upon receipt of a go-back channel signal from said remote control device, activating said mode switching means causing said interactive application signal to be displayed in said display device.

When said interactive application mode is being displayed and said last viewed item is a first channel, upon receipt of said go-back channel signal from said remote control device, it is preferable that the method comprise activating said mode switching means causing said television program mode to be active and said first channel to be tuned and displayed in said display device.

When a second channel of said television program signal is tuned and displayed and said last viewed item is a first channel, upon receipt of said go-back channel signal from said remote control device, it is also preferable that the method comprise activating a channel switching means causing said first channel to be tuned and displayed in said display device.

In yet another embodiment, the method further comprises: upon receipt of a commercial skip enabling signal from said remote control device, enabling a commercial skip feature;

and wherein when said commercial skip feature is enabled and said television program signal is being displayed, upon detecting a beginning of a commercial break, activating said mode switching means causing said interactive application signal to be displayed until either detection of an end of a commercial break or upon elapse of a selected period of time. In this embodiment, the commercial skip feature can be adapted to detect said beginning and said end of said commercial break.

It is preferred that the interactive application mode is a browser mode and said interactive application signal be a browser signal. When a browser is the interactive application, the method can further comprise: upon receipt of television-during-download enabling signal from said remote control device, enabling a television-during-download function; and wherein when said browser signal is being displayed and said television-during-download function is enabled, upon a download above a threshold time being detected, activating said mode switching means causing said television program signal to be displayed until detection of completion of said download.

MODES FOR CARRYING OUT THE INVENTION

The preferred embodiments will be illustrated with reference to the drawings. Various other embodiments should become readily apparent from this description to those skilled in this art.

Figure 1:
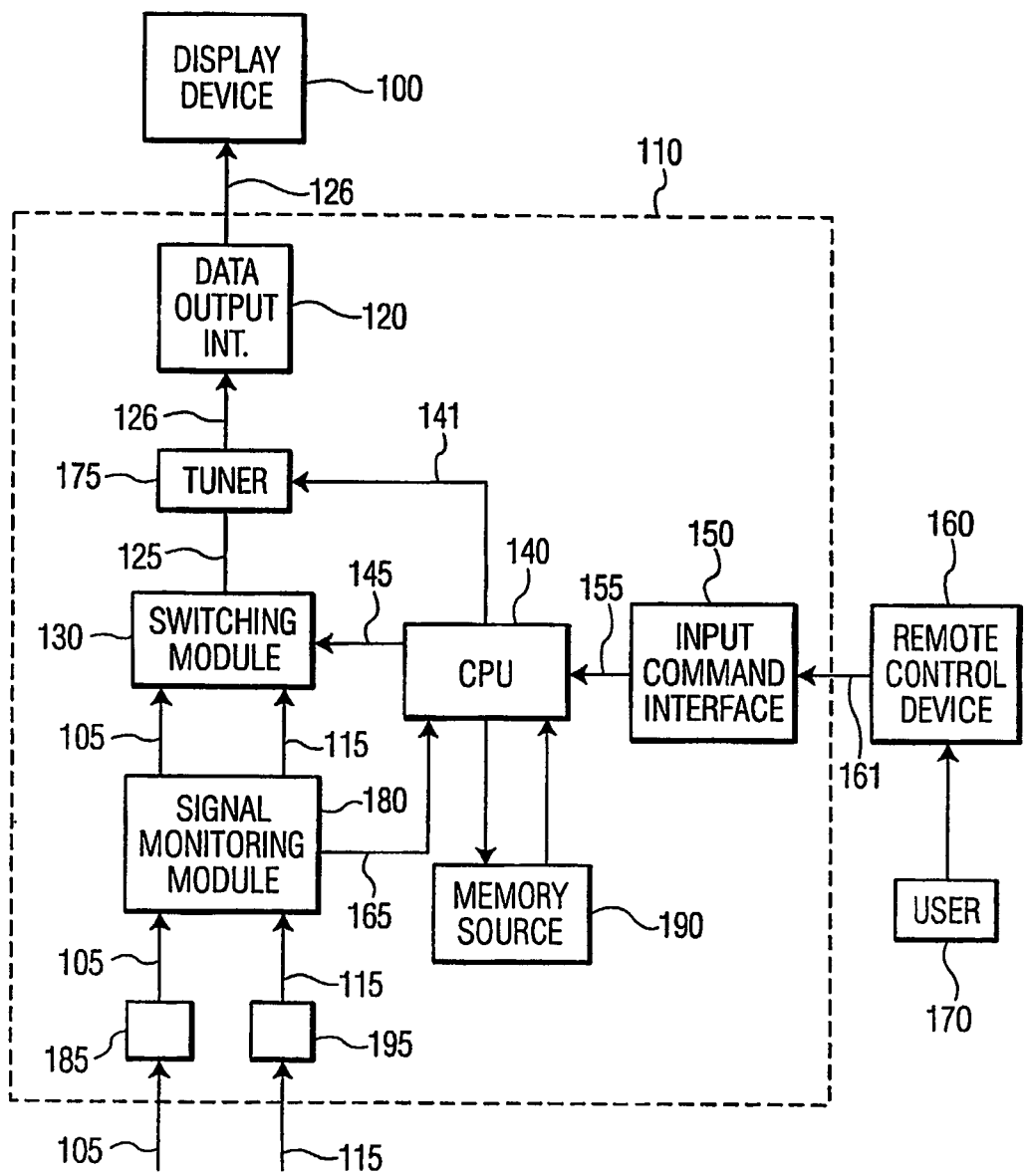
FIG. 1 is a block diagram of an embodiment of an apparatus for switching between a television program mode and an interactive application mode operating in accordance with the present invention.

Referring to FIG. 1, receiver 110 capable of switching between a television program mode and an interactive application mode is illustrated. Receiver 110 comprises input command interface 150, central processing unit ("CPU") 140, memory source 190, switching module 130, signal monitoring module 180, television program signal receiver 185, interactive application signal receiver 195, and data output interface 120. Receiver 110 is operably connected to display device 100 and is further adapted to receive and process user command signals from remote control device 160.

Television program signal receiver 185 is adapted to receive, and decode if necessary, television program signal 105. Television program signal 105 can comprise both an image component and an audio component. Television program receiver 185 then transmits television program signal to 105 to signal monitoring module 180. Signal monitoring module 180 is adapted to monitor television program signal 105 as it passes through and to identify certain indicators contained within television program signal 105, such as a beginning or an end of a commercial break. The ability of signal monitoring module 180 to identify commercial break beginning and ends will be discussed in more detail below. After being monitored by signal monitoring module 180, television program signal 105 is transmitted to witching module 130.

Interactive application receiver 195 is adapted to receive, and decode if necessary, incoming interactive application signal 115. Interactive application signal 115 can comprise both an image component and an audio component. As used herein, an interactive application is any program the execution of which is controlled by choices made by a user. Common examples of interactive applications are video games, word processors, spreadsheet programs, and Internet browser programs. Depending on the type and use of the interactive application involved, interactive application can be used for an almost endless number of purposes, ranging from performing employment related tasks to serving purely recreational purposes. Interactive application receiver 195 then transmits interactive application signal 115 to signal monitoring module 180. Signal monitoring module 180 is adapted to monitor interactive application signal 115 as it passes through and is further adapted to identify certain indicators contained within interactive application signal 115, such as a beginning or an end of a downloading state and estimated download times. The ability of signal monitoring module 180 to identify downloading and estimated download times is well known in the art. After being monitored by signal monitoring module 180, interactive application signal 115 is transmitted to switching module 130.

Switching module 130 is controlled by switching commands 145 sent by CPU 140 and is adapted to alternate between a television program mode and an interactive application mode. When switching module 130 is in the television program mode, switching module 130 transmits television program signal 105 to tuner 175 as switching output signal 125. When switching module 130 is in the interactive application mode, switching module 130 transmits interactive application signal 115 to tuner 175 as switching output signal 125. Upon receipt of a proper switching command 145 from CPU 140, switching module 130 can be alternated between television program mode and interactive application mode.

Tuner 175 receives switching output signal 125 and transmits this signal to data output interface 120 as output signal 126. When switching module 130 is in interactive application mode and switching output signal 125 is interactive application signal 115, switching output signal 125 will pass through tuner 175 unaltered as output signal 126. However, if switching module 130 is in television program mode and switching output signal 125 is television program signal 105, tuner 175 will tune the incoming television program signal 105 so that output signal 126 is a tuned channel signal for displaying a specific program channel in display device 100. The exact channel tuned in and displayed in display device 100 is controlled by tuning commands 141 from CPU 140.

Output signal 126, whether interactive application signal 115 or a tuned channel of television program signal 105, is transmitted to data output interface 120. Data output interface 120 can be any type of port connection capable of completing an electrical connection with display device 100 and receiver

110. Output signal 126 passes through data output interface 120 and to display device 100 for display therein.

Display device 100, which can be a television or computer monitor, is capable of presenting images and sounds according to the content of either television program signal 105 (now output signal 126) or interactive application output data 115 (now output signal 126). Although not shown in FIG. 1, display device 100 has a display screen for displaying images and a means for outputting sounds, such as speakers. Whether the content of television program signal 105 or the content of interactive application signal 115 is presented by display device 100 depends on whether switching module 130 designates television program signal 105 or interactive application signal 115 as switching output signal 125. It is also possible for display device 100 to be a television or computer monitor with picture-in-picture (PIP) capabilities. If display device 100 has PIP capabilities, the display screen (not shown) will comprise a primary display area and a secondary display area. As such, two signals can be displayed simultaneously. In PIP display devices, the primary display area constitutes a majority of the display screen while the secondary display area constitutes a smaller area of the display screen and is often contained within the primary display area. When display device 100 has PIP capabilities, switching module 130 is modified so that it is capable of transmitting a second switching output signal.

As used herein and in the claims, when a particular mode is active or when a signal is displayed, it means that that the signal associated with that mode is being displayed in display device 100. If the display device has PIP capabilities, it means that the signal is being displayed in the primary display area.

Figure 6:
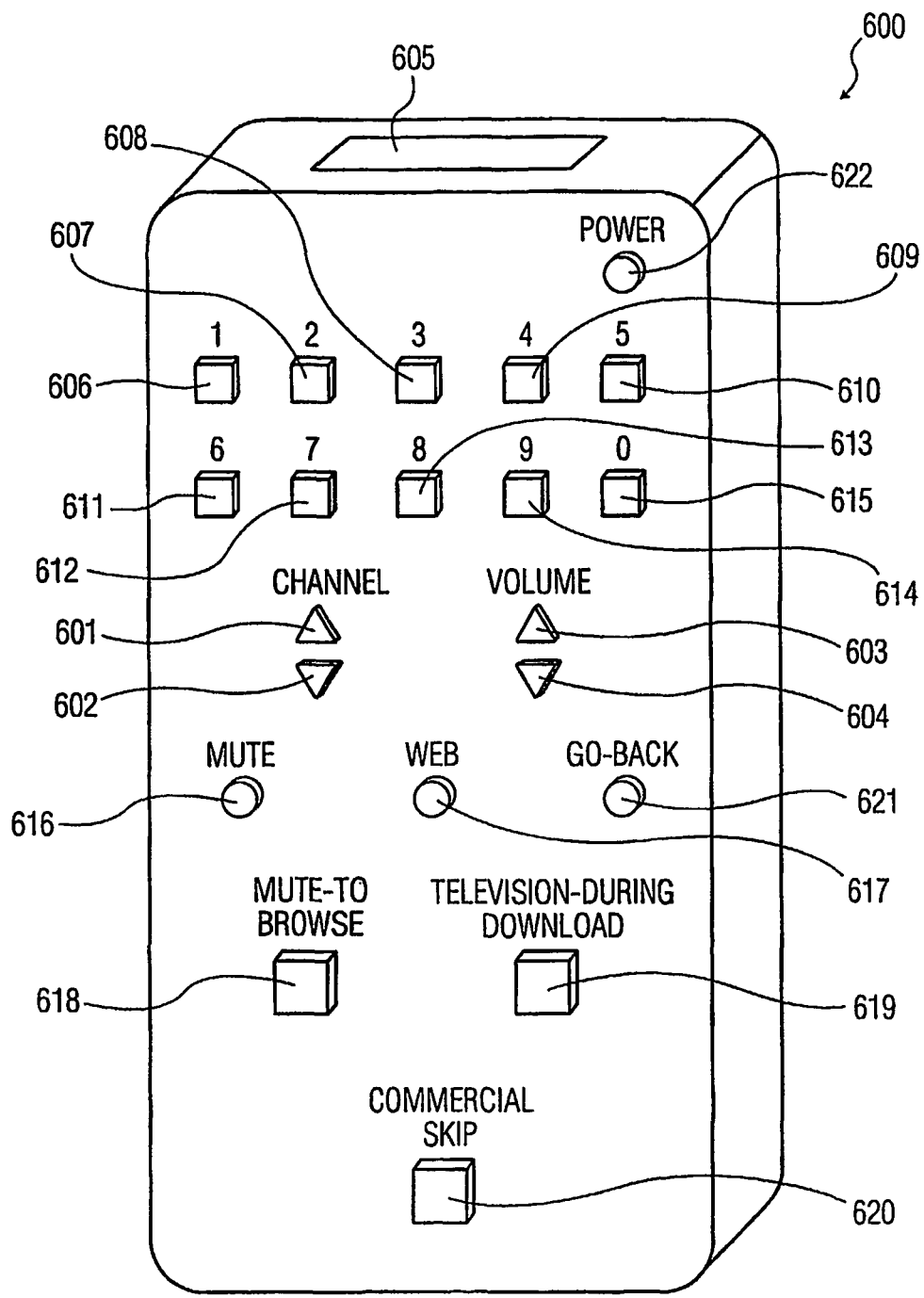
FIG. 6 is a perspective view of an infrared remote controller adapted to operate with the apparatus of FIGS. 1 and 6 according to the present invention.

The available functions of receiver 110 are controlled by a user 170. A user, through the use of remote control device 160 can send user input signals 161 to receiver 110. Remote control device 160 can be a mouse, a keyboard, or a hand-held controller. User 170 causes remote control device 160 to generate user command signals 161 by entering choices into remote control device 160 by a variety of methods, including pressing buttons, moving a joystick, or manipulating any type of input sensor on remote control device 160. Upon choices being entered into remote control device 160, remote control device 160 converts choices to user command signals 161 and transmits user command signals 161 to input command interface 150. Remote control device 160 communicates user command signals 161 to input command interface 150 via an electrical connection or via infrared signals. Where command signals 161 are communicated to input command interface 150 via infrared signal, input command interface 150 is an infrared sensor and remote control device 160 is a hand-held infrared remote control 600 (FIG. 6). In this embodiment, remote control device 160 will be capable of converting infrared signals to electrical signals. Upon receiving user command signals 161 from remote control device 160, input command interface 150 transmits user command signals 161 to CPU 140 as corresponding electrical command signals 155. CPU 140 then executes commands corresponding to the electrical command signals 155 such as switching commands 145, tuning commands 141, or any other command that is entered by user 170. Execution and generation of commands by CPU 140 can also be controlled by software stored in memory source 190 and signals received by signal monitoring module 180 alone or in combination with user command signals 161.

FIG. 6 illustrates a hand-held infrared remote control 600 adapted to function according to the present invention. Infrared remote control 600 comprises channel up key 601, channel down key 602, volume up key 603, volume down key 604, channel number keys 606-615, mute key 616, web key 617, mute-to-browse key 618, television-during-download key 619, commercial skip key 620, go-back key 621, and a power key 622. Infrared remote control 600 further comprises infrared signal generator 605. When a user 170 presses any of the keys 601-604 and 606-622 on remote control 600 an appropriate user infra-red command signal 161 (FIG. 1) is generated by IR generator 605 and transmitted to input command interface 150 (FIG. 1). As discussed above, the user infrared command signal 161 is transmitted to properly programmed CPU 140, which in turn executes the appropriate command.

FIGS. 2-5 illustrate flowcharts of the decision process undertaken by CPU 140 in carrying out the user input commands 161 according to one embodiment of the present invention. Such decision processes can be programmed directly into CPU 140 or stored in memory source 190 as conventional software programs that are executed by CPU 140. The flowcharts of FIGS. 2-5 will now be discussed in relation to the apparatus of FIGS. 1 and 6.

Figure 2:
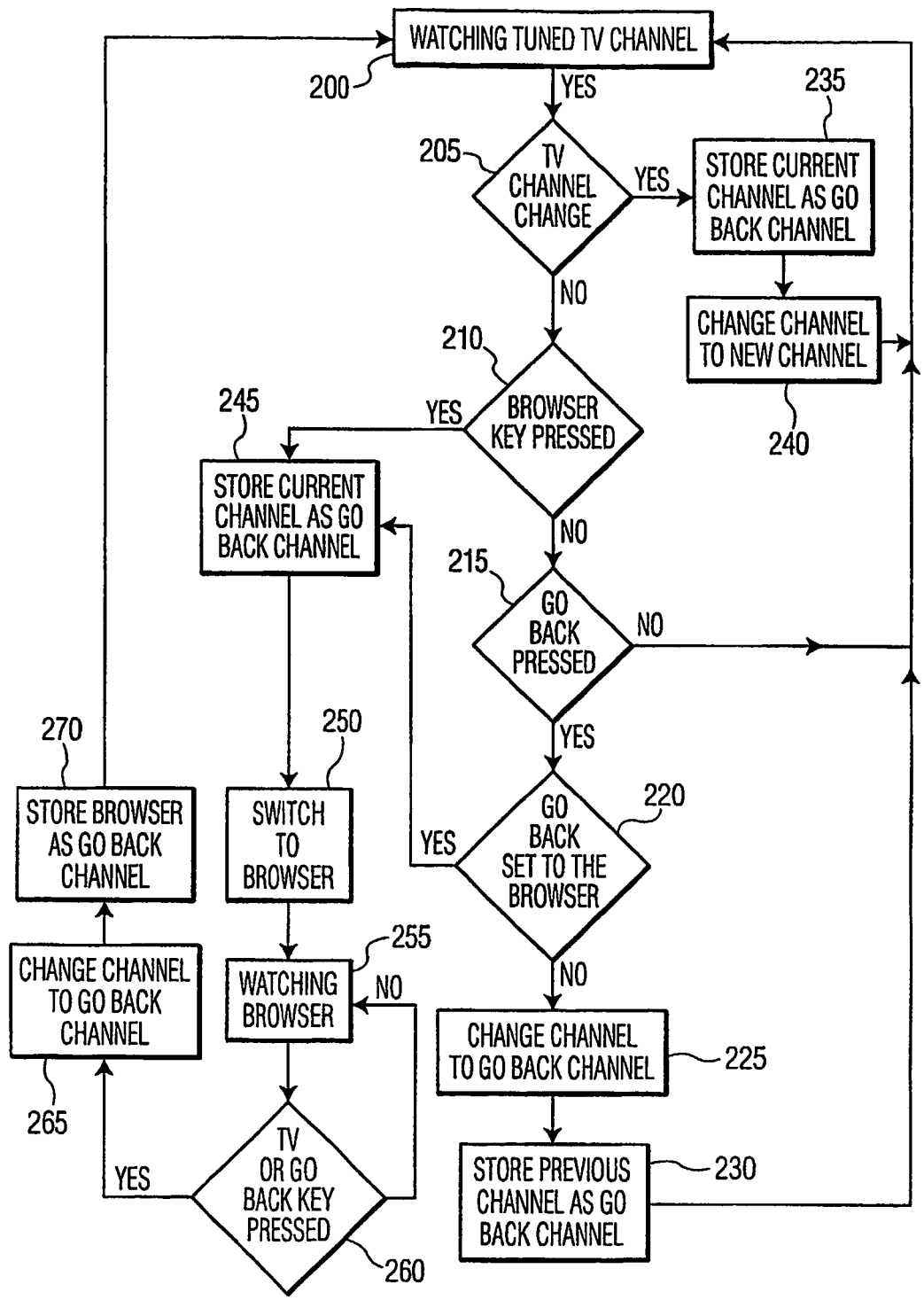
FIG. 2 is a flowchart of the decision process undertaken by the apparatus of FIG. 1 in switching between television program mode and interactive application mode through the use of a go-back signal.

Referring to FIG. 2, a flowchart of the decision process undertaken by receiver 110 in switching between television program mode and browser mode through the use of a go-back signal is illustrated. At block 200, CPU 140 checks to see if switching module 130 is in television program mode and whether a specific television channel is tuned by tuner 175 and displayed in display device 100. If Yes, CPU 140 proceeds to decision block 205 and monitors input signal 155 for a change channel signal from IR remote control 600. A change channel signal will be generated by IR remote control 600 when user 170 presses channel keys 606-615 or channel up and down keys 601-602. If a change channel signal has been received, the answer is YES and CPU 140 proceeds to process block 235. At process block 235, CPU 140 stores the current channel being displayed in display device 100 as a go-back channel before responding to the change channel signal because this current channel is the last viewed item. CPU 140 then proceeds to process block 240 and changes the channel being displayed in display device 100 according to the change channel signal. This is done by sending the appropriate tuning signal 141 to tuner 175. CPU 140 then starts the decision process over at block 200.

If at decision block 205, a change channel signal was not received by CPU 140, a NO answer is generated and CPU 140 will proceed to decision block 210. At decision block 210, CPU 140 will monitors input signal 155 for an activate browser from IR remote control 600. An activate browser signal is generated by IR remote control 600 when user 170 presses web key 617. If user 170 has pressed web key 617 and an activate browser signal is received by CPU 140, the answer at decision block 210 is YES and CPU 140 proceeds to process block 245. At process block 245, CPU 140 stores the current channel being displayed in display device 100 as a go-back channel before responding to the activate browser signal because this current channel is the last viewed item. At process block 250, CPU 140 responds to the activate browser signal and generates switching command 145 which is sent to switching module 130. Switching module 130 responds to switching signal 145 by switching to browser mode (i.e. interactive application mode) and transmitting incoming browser signal 115 as switching output signal 125 for display in display device 100, completing process block 255. Next, CPU 140 proceeds to decision block 260 and monitors input signal 155 for a go-back signal or an activate television mode signal from IR remote control 600. A go-back signal is generated by IR remote control 600 when user 170 presses go-back key 621. An activate television mode signal is generated by IR remote control 600 when user 170 presses web key 617.

If a go-back signal or an activate television mode signal is not received by CPU 140, the answer at decision block 260 is NO and CPU 140 returns to process block 255. However, if a go-back signal or an activate television mode signal is received by CPU 140, the answer at decision block 260 is YES and CPU 140 proceeds to process block 265. At process block 265, CPU 140 responds to the go-back signal or the activate television mode signal and sends switching signal 145 to switching module causing said switching module 130 to switch to television program mode. CPU 140 then retrieves the go-back channel that was stored in memory source 190 at process block 245 and sends an appropriate tuning signal 141 to tuner 175 that will tune in the go-back channel for transmission as output signal 126 for display in display device 100, completing process block 265. CPU 140 then proceeds to process block 270 and stores the browser as the go-back channel in memory source 190 because the browser is now the last viewed item.

If at step 210, a NO answer is generated, CPU 140 proceeds to decision block 215. At decision block 215, CPU 140 monitors for receipt of a go-back signal from IR remote control 600. If a go-back signal is not received, the answer is NO and the process begins over at process block 200. However, if a go-back signal is received, CPU 140 proceeds to decision block 220 and checks memory source 190 for the identity of the stored go-back channel. If the identity of the stored go-back channel is the browser, CPU 140 proceeds to process block 245. If the identity of the stored go-back channel is not the browser, a NO answer is generated and CPU 140 proceeds to process block 225. At process block 225, CPU 140 retrieves the stored go-back channel from memory source 190, which would be a previous channel tuned in by tuner 75. CPU 140 then sends tuning signal 141 to tuner 75 and tunes in the go-back channel for display in display device 100, completing process block 225.

CPU 140 then moves to process block 230. Upon tuning in the go-back channel, CPU 140 then stores the previously tuned channel as the new go-back channel in memory source 190, completing process block 230.

Figure 3:
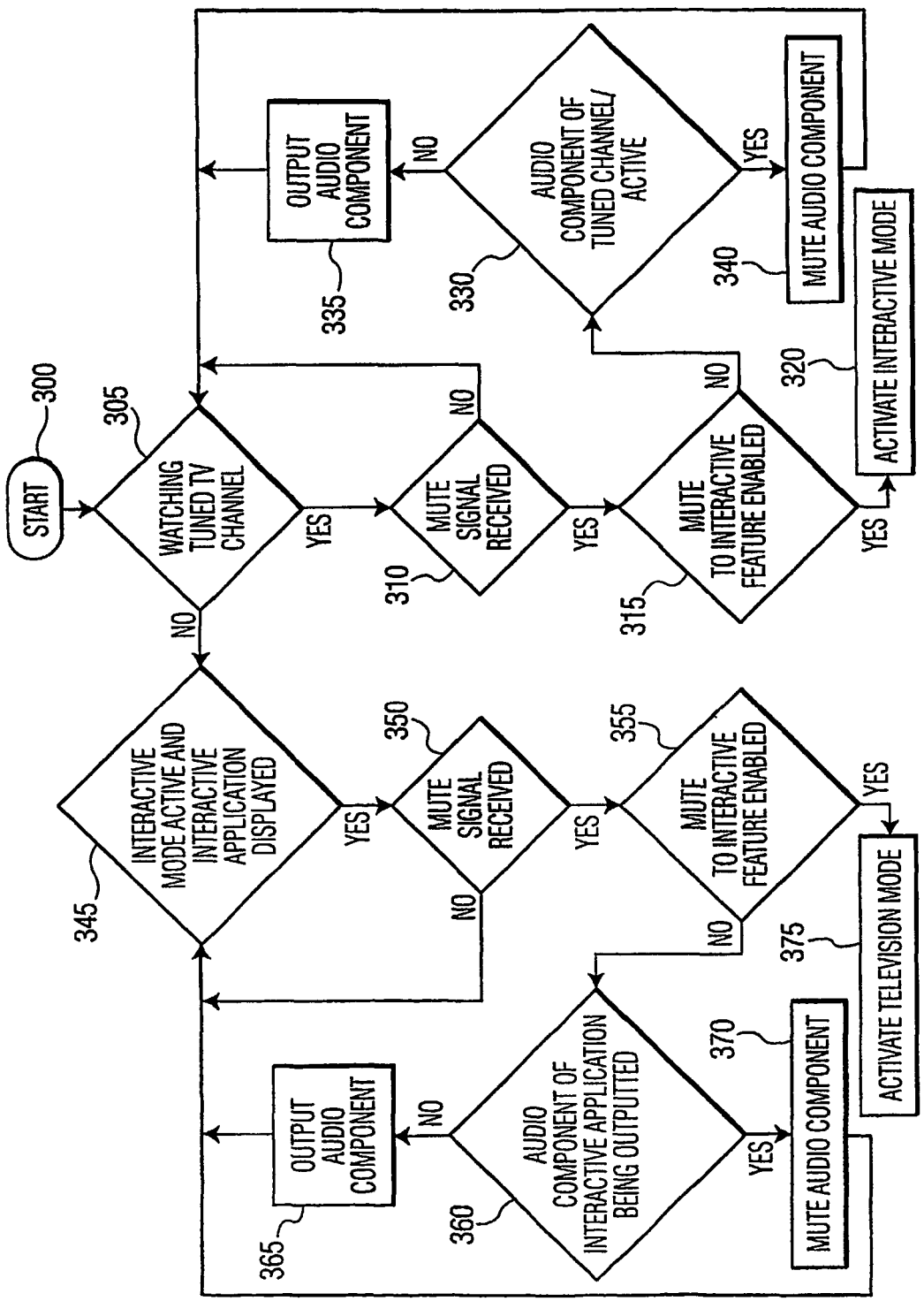
FIG. 3 is a flowchart of the decision process undertaken by the apparatus of FIG. 1 in switching between television program mode and interactive application mode through the use of a mute signal according to the present invention.

Referring now to FIG. 3, a flowchart of the decision process undertaken by CPU 140 of receiver 110 in switching between television program mode and interactive application mode through the use of a mute-to-browse feature is illustrated.

At decision block 305, CPU 140 first checks to see if switching module 130 is in television program mode and whether a channel is tuned in by tuner 175 and displayed in display device 100. If YES, CPU 140 proceeds to decision block 310. CPU 140 then monitors input signal 155 for a mute signal from IR remote control 600. A mute signal is generated by IR remote control 600 by user 170 pressing mute key 616. If CPU 140 does not detect a mute signal, the answer is NO and CPU 140 proceeds to decision block 305. However, if CPU 140 detects a mute signal, the answer is YES and CPU 140 proceeds to decision block 315. CPU 140 then checks to see if a mute-to-interactive application feature was previously enabled by user 170. The mute-to-interactive application feature is enabled by CPU 140 receiving a mute-to-interactive application enable signal from IR remote control 600. The mute-to-interactive application enable signal is generated by IR remote control 600 by user 170 pressing mute-to-browse key 618. Upon receiving the mute-to-interactive application enable signal, CPU 140 enables the mute-to-interactive application feature, which is stored as and controlled by software commands stored in memory source 190. At decision block 315, if CPU 140 detects that the mute-to-interactive application feature is enabled, then CPU 140 sends switching signal 145 to switching module 130 causing said interactive application mode to become active and displaying interactive application signal 115 in display device 100.

However, if at decision block 315, CPU 140 detects that the mute-to-interactive application feature is not enabled, CPU 140 then proceeds to decision block 330. CPU 140 then checks to see if the audio component of the tuned channel of television program signal 105 being displayed in display screen 100 is being outputted. If YES, CPU 140 proceeds to process block 340 and sends the appropriate signal to mute the audio component by procedures known in the art. If NO, CPU 140 proceeds to process block 335 and sends the appropriate signal to output the audio component by procedures known in the art.

If at decision step 305, CPU 140 determines that switching module 130 is not in television program mode, the answer is NO and CPU 140 proceeds to decision block 345 where it checks to see if switching module 130 is in interactive application mode. If YES, CPU 140 proceeds to decision block 350. CPU 140 then monitors input signal 155 for a mute signal from IR remote control 600. A mute signal is generated by IR remote control 600 by user 170 pressing mute key 616. If CPU 140 does not detect a mute signal, the answer is NO and CPU 140 proceeds to decision block 345. However, if CPU 140 detects a mute signal, the answer is YES and CPU 140 proceeds to decision block 355. CPU 140 then checks to see if a mute-to-interactive application feature was previously enabled by user 170. The mute-to-interactive application feature is enabled by CPU 140 receiving a mute-to-interactive application enable signal from IR remote control 600. The mute-to-interactive application enable signal is generated by IR remote control 600 by user 170 pressing mute-to-browse key 618. Upon receiving the mute-to-interactive application enable signal, CPU 140 enables the mute-to-interactive application feature, which is stored as and controlled by software commands stored in memory source 190. At decision block 355, if CPU 140 detects that the mute-to-interactive application feature is enabled, then CPU 140 sends switching signal 145 to switching module 130 causing said television program mode to become active and displaying a tuned channel of television program signal 105 in display device 100.

However, if at decision block 355, CPU 140 detects that the mute-to-interactive application feature is not enabled, CPU 140 then proceeds to decision block 360. CPU 140 then checks to see if the audio component of the interactive application signal 105 being displayed in display screen 100 is being outputted. If YES, CPU 140 proceeds to process block 370 and sends the appropriate signal to mute the audio component by procedures known in the art. If NO, CPU 140 proceeds to process block 365 and sends the appropriate signal to output the audio component by procedures known in the art.

Figure 4:
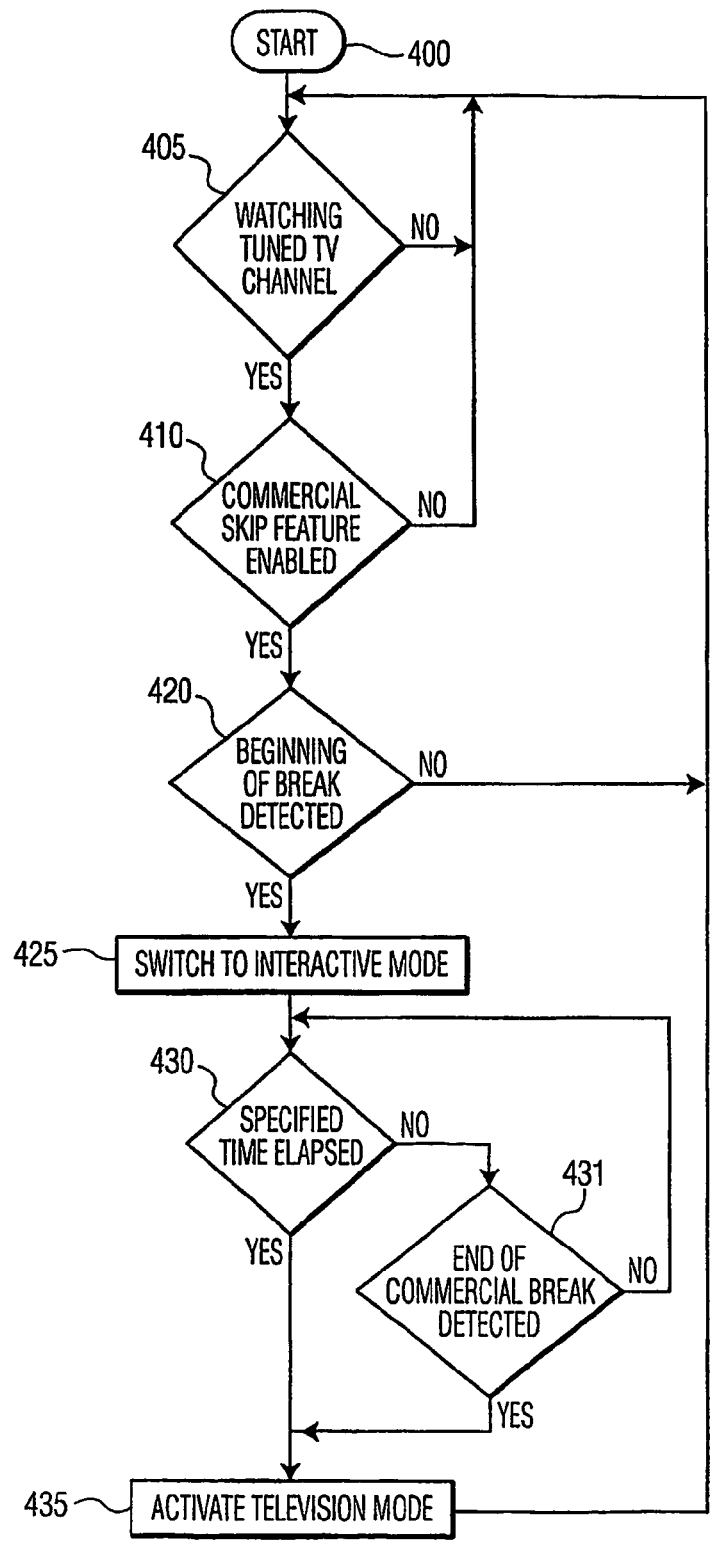
FIG. 4 is a flowchart of the decision process undertaken by the apparatus of FIG. 1 in automatically switching between television program mode and interactive application mode during a commercial break.

Referring now to FIG. 4, a flowchart of the decision process undertaken by CPU 140 of receiver 110 in switching between television program mode and interactive application mode through the use of a commercial skip feature is illustrated.

Block 400 is start. At decision block 405, CPU 140 first checks to see if switching module 130 is in television program mode and whether a channel is tuned in by tuner 175 and displayed in display device 100. IF NO, CPU 140 starts over. If YES, CPU 140 proceeds to decision block 410. CPU 140 then checks to see if a commercial skip feature was previously enabled. The commercial skip feature is enabled by CPU 140 receiving a commercial skip enable signal from IR remote control 600. The commercial skip enable signal is generated by IR remote control 600 by user 170 pressing commercial skip key 620. Upon receiving the commercial skip enable signal, CPU 140 enables the commercial skip feature, which is stored as and controlled by software commands stored in memory source 190. If at decision block 410, CPU 140 detects that the commercial skip feature is not enabled, then CPU 140 returns to start 400. However, if at decision block 410, CPU 140 detects that the commercial skip feature is enabled, then CPU 140 proceeds to decision block 420 and monitors for a commercial break beginning signal 165 from signal monitoring module 180. Signal monitoring module 180 monitors the incoming television program signal 115 and is adapted to detect the beginning of a commercial break. There are a number of ways known in the art for detecting the beginning of a commercial break.

The preferred method of detecting the beginning of a commercial break takes advantage of the fact that when the content of television program signal 105 switches to a commercial from an entertainment program, there is a detectable drop in the amplitude of television program signal 105 (i.e. a blanking screen). Signal monitoring module 180 is programmed to constantly monitor the amplitude of television program signal 105 and detect drops in the amplitude. Upon detecting an initial drop in the amplitude of television program signal 105, the internal circuitry of signal monitoring module 180 is programmed to generate and transmit commercial break beginning signal 165 to CPU 140.

If signal monitoring module 180 does not detect the beginning of a commercial break, the answer at decision block 420 is NO and CPU 140 returns to start 400. However, if signal monitoring module 180 detects the beginning of a commercial break and sends commercial break beginning signal 165 to CPU 140, the answer at decision block 420 is YES and CPU 140 proceeds to program block 425.

At program block 425, CPU 140 sends switching signal 145 to switching module 130 causing said interactive application mode to become active and displaying interactive application signal 115 in display device 100. CPU 140 then proceeds to decision blocks 430 and 431. At decision block 430 and 431, CPU 140 waits for either a commercial break end signal from signal monitoring module 180 or for a specified amount of time to elapse. User 170 specifies the amount of time that CPU 140 will wait by pressing commercial skip key 620 multiple times which will add or delete time. Signal monitoring module 180 is adapted to transmit a commercial break end signal to CPU 140 upon detecting the end of a commercial break. The preferred method of detecting or determining the end of commercial breaks takes advantage of the fact that commercials and commercial breaks often last a predictable amount of time depending on time of day, geographical location, and day of the week. Typical commercial break duration times can be reasonably estimated through statistical analysis. In order to take advantage of this fact, signal monitoring module 180 is programmed to have an internal timer that has a default setting or can be set by a user. The timer is activated and begins to count down upon signal monitoring module 180 detecting the beginning of a commercial break. Upon expiration of the set time, signal monitoring module 180 is programmed to generate a commercial break end signal. Another method in which signal monitoring module 180 can detect the beginning and end of a commercial break is by "spooling" television program signal 105.

If signal monitoring module 180 does not detect the end of a commercial break or the specified time has not expired, the answer at decision block 430 or 431 is NO and CPU 140 waits. When signal monitoring module 180 detects the end of a commercial break and sends a commercial break end signal to CPU 140, or if the specified time expires, the answer at decision block 430 or 431 is YES and CPU 140 proceeds to program block 435. CPU 140 then sends switching signal 145 to switching module 130 causing said television program mode to become active and displaying a tuned channel of television program signal 105 in display device 100.

Figure 5:
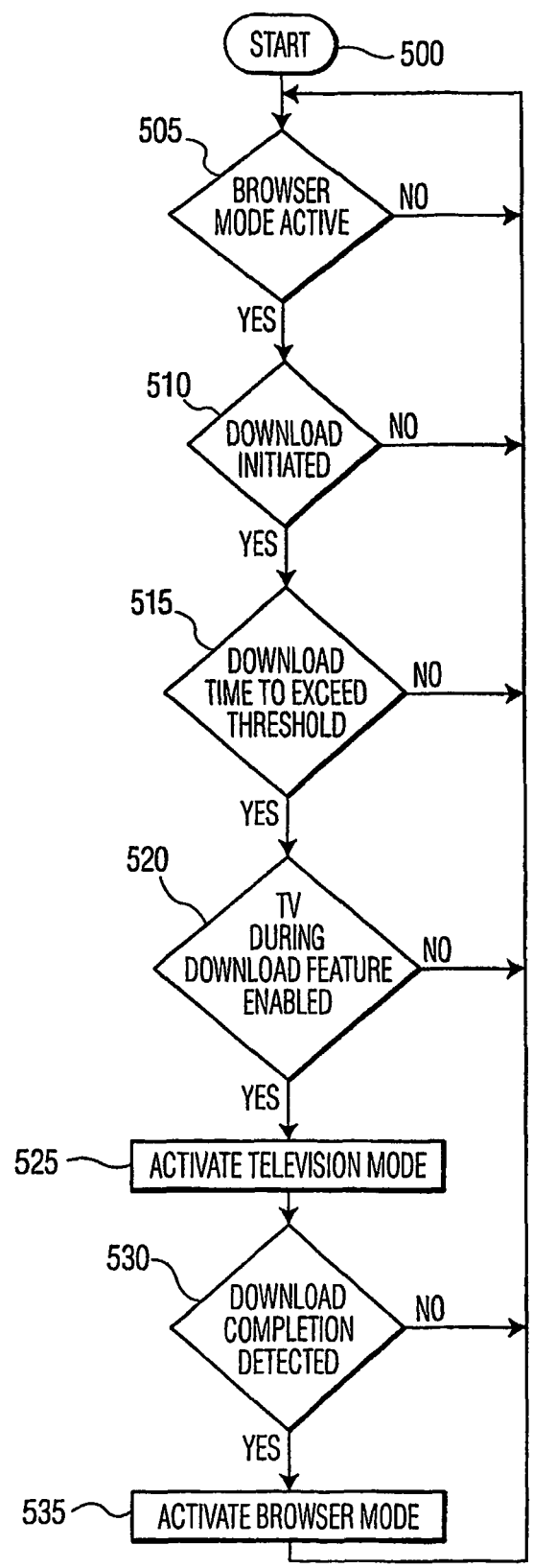
FIG. 5 is a flowchart of the decision process undertaken by the apparatus of FIG. 1 in automatically switching between television program mode and browser mode during the downloading of data.

Referring now to FIG. 5, a flowchart of the decision process undertaken by CPU 140 of receiver 110 in switching between television program mode and interactive application mode through the use of a television-during-download feature is illustrated.

Block 500 is start. At decision block 505, CPU 140 first checks to see if switching module 130 is in browser mode and whether a browser is displayed in display device 100. IF NO, CPU 140 starts over. If YES, CPU 140 proceeds to decision block 510. CPU 140 then checks to see if a download has been initiated. Signal monitoring module 180 monitors interactive application signal 115 and is programmed to detect when a download is initiated and will send an appropriate signal to CPU 140 upon detection. If a download is not detected, the answer is NO and CPU 140 returns to start 500. If a download is detected, the answer is YES and CPU 140 proceeds to decision block 515.

At decision block 515, CPU 140 then checks to see if the download will take a threshold time to complete. This can be accomplished by signal monitoring module 180 being programmed to estimate the time that a download takes and sending this information to CPU 140 via an appropriate signal. If the signal sent by signal monitoring module 180 indicates that the download time is below a threshold time, then the answer is NO and CPU 140 returns to start 500. However, if the signal sent by signal monitoring module 180 indicates that the download time is above or equal to a threshold time, then the answer is YES and CPU 140 proceeds to decision block 520.

At decision block 520, CPU 140 checks to see if a television-during-download feature has been enabled. The television-during-download feature is enabled by CPU 140 receiving a television-during-download enable signal from IR remote control 600. The television-during-download enable signal is generated by IR remote control 600 by user 170 pressing television-during-download key 619. Upon receiving the television-during-download feature enable signal, CPU 140 enables the television-during-download feature, which is stored as and controlled by software commands stored in memory source 190. If at decision block 520 CPU 140 detects that the television-during-download feature is not enabled, then CPU 140 returns to start 500. However, if at decision block 410, CPU 140 detects that the television-during-download feature is enabled, then CPU 140 proceeds to program block 525.

At program block 525, CPU 140 sends switching signal 145 to switching module 130 causing said television program mode to become active and displaying television program signal 115 in display device 100. CPU 140 then proceeds to decision block 530. At decision block 530, CPU 140 waits for a signal from signal monitoring module 180 indicating that the download is complete. Signal monitoring module 180 is programmed to detect the end of a download and send a corresponding signal to CPU 140 by methods standard in the art. Upon receiving a signal from signal monitoring module 180 indicating that download is complete, CPU 140 proceeds to process step 535, sending switching signal 145 to switching module 130 causing said browser mode to become active and displaying a browser in display device 100.

While the invention and preferred embodiments have been described and illustrated in sufficient detail that those skilled in this art may readily make and use the invention, various alternatives, modifications and improvements should become readily apparent to this skilled in this art without departing from the spirit and scope of the invention.

The invention claimed is:

1. An apparatus for displaying at least two modes comprising an interactive application mode and a television program mode on a display device, the apparatus comprising:
- a television program signal receiver;
- an interactive application signal receiver;
- a switching module switching between said television program mode and said interactive application mode being active in said display device;
- an input command interface to receive remote control signals from a remote control device having a mute key for generating a mute signal, a mute-to-browser key for generating a mute-to-browser signal, and a television-during-download key for generating a television-during-download signal, wherein said mute key, mute-to-browser key, and television-during-download key are each independent keys on the remote control device;
- a processor to enable a mute-to-interactive application feature responsive to receiving said mute-to-browser signal from said input command interface;
- wherein when said mute-to-interactive application feature is enabled and said television program mode is active in said display device displaying a television program with television audio, upon receipt of said mute signal, said television audio is muted and said switching module is activated causing said interactive application mode to be active in said display device;
- if said mute-to-interactive application feature is not enabled and said television program mode is active in said display device, upon receipt of said mute signal, said television audio is muted and said television program mode continues to be active in said display device without switching over to said interactive application mode;
- wherein when said mute-to-interactive application feature is enabled and said interactive application mode is active in said display device displaying an interactive application with application audio, upon receipt of said mute signal, said application audio is muted and said switching module is activated causing said television program mode to be active in said display device;
- if said mute-to-interactive application feature is not enabled and said interactive application mode is active in said display device, upon receipt of said mute signal, said application audio is muted and said interactive application mode continues to be active in said display device without switching over to said television program mode;
- a tuner to switch channels when said television program mode is active in said display device;
- said processor to enable a television-during-download function responsive to receiving said television-during-download signal from said input command interface, wherein said interactive application mode is a browser mode;
- wherein when a download is initiated during said browser mode, download time of said download exceeds a threshold before said download has completed, if said television-during- download-function is enabled, said download continues to run and said switching module is activated causing said television program mode to be active until detection of completion of said download;
- if said download is initiated during said browser mode, said download time of said download exceeds a threshold before said download has completed but said television-during-download function is not enabled, said download continues to run to completion in said browser mode without switching over to said television program mode;
- wherein said remote control device further comprises a go-back channel key for generating a go-back channel signal to be received by said input command interface, said processor stores a last viewed item as a go-back channel in a memory source, wherein when said television program mode is active and said last viewed item is said interactive application mode, upon receipt of said go-back channel signal, said switching module is activated causing said interactive application mode to be active in said display device, and when said television program mode is active and said last viewed item is a first television channel in said television program mode, upon receipt of said go back channel signal, said switching module is activated causing said tuner tunes said first television channel; and
- wherein when said interactive application mode is active and said last viewed item is said first television channel of said television program mode, upon receipt of said go-back channel signal, said switching module is activated causing said television program mode to be active and said first television channel to be displayed in said display device and said processor saves said interactive application mode as said last viewed item.

2. A method of switching between at least two modes comprising an interactive application mode and a television program mode, the method comprising the steps of:
- receiving a television program signal with television audio;
- receiving an interactive application signal with application audio;
- displaying one of said television program signal or said interactive application signal in a display device;
- an input command interface to receive remote control signals from a remote control device having a mute key for generating a mute signal, a mute-to-browser key for generating a mute-to-browser signal, and a television-during-download key for generating a television-during-download signal, wherein said mute key, mute-to-browser key, and television-during-download key are each independent keys on the remote control device;
- upon receipt of a mute-to-interactive application enabling command, enabling a mute-to-interactive application feature;
- wherein when said mute-to-interactive application feature is enabled and said television program signal is being displayed in said display device, upon receipt of a mute signal from a remote control device, said method further comprises muting said television audio and activating a mode switching mean causing said interactive application signal to be displayed in said display device;
- if said mute-to-interactive application feature is not enabled and said television program signal is being displayed in said display device, upon receipt of said mute signal, said method further comprises muting said television audio and maintaining display of said television program signal in said display device without switching over to display said interactive application signal; and
- wherein when said mute-to-interactive application feature is enabled and said interactive application signal is being displayed in said display device, upon receipt of said mute signal, said method further comprises muting said application audio and activating said mode switching means causing said television program signal to be displayed in said display device;

if said mute-to-interactive application feature is not enabled and said interactive application signal is being displayed in said display device, upon receipt of said mute signal, said method further comprises muting said application audio and maintaining display of said interactive application signal in said display device without switching over to display said television program signal;

tuning a channel of said television program signal for display in said display device;

storing a last viewed item as a go-back channel in a memory source in response to a channel change or a mode switch; and wherein when said television program signal is being displayed and said last viewed item is said interactive application signal, upon receipt of a go-back channel signal from said remote control device, said method further comprises activating said mode switching means causing said interactive application signal to be displayed in said display device;

wherein said interactive application mode is a browser mode and said interactive application signal is a browser signal, said method further comprises upon receipt of television-during-download enabling signal from said remote control device, enabling a television-during-download function; and when a download is initiated during said browser signal being displayed download time of said download exceeds a threshold before said download has completed, and if said television-during-download function is enabled, continuing said download and activating said mode switching means causing said television program signal to be displayed until detection of completion of said download;

if said television-during-download function is not enabled, continuing said download and maintaining display of said browser signal without switching over to display said television program signal, wherein said remote control device further comprises a go-back channel key for generating a go-back channel signal to be received by said input command interface, said processor stores a last viewed item as a go-back channel in a memory source, wherein when said television program mode is active and said last viewed item is said interactive application mode, upon receipt of said go-back channel signal, said switching module is activated causing said interactive application mode to be active in said display device, and when said television program mode is active and said last viewed item is a first television channel in said television program mode, upon receipt of said go back channel signal, said switching module is activated causing said tuner tunes said first television channel; and wherein when said interactive application mode is active and said last viewed item is said first television channel of said television program mode, upon receipt of said go-back channel signal, said switching module is activated causing said television program mode to be active and said first television channel to be displayed in said display device and said processor saves said interactive application mode as said last viewed item.

3. The apparatus of claim 1, wherein said interactive application mode is a browser mode.

* * * * *